United States Patent
Bellessort

(10) Patent No.: US 8,533,172 B2
(45) Date of Patent: Sep. 10, 2013

(54) METHOD AND DEVICE FOR CODING AND DECODING INFORMATION

(75) Inventor: Romain Bellessort, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 579 days.

(21) Appl. No.: 12/273,175

(22) Filed: Nov. 18, 2008

(65) Prior Publication Data

US 2009/0138529 A1     May 28, 2009

(30) Foreign Application Priority Data

Nov. 22, 2007   (FR) ..................................... 07 59236

(51) Int. Cl.
*G06F 17/30*     (2006.01)

(52) U.S. Cl.
USPC ............................ 707/705; 707/695; 707/791

(58) Field of Classification Search
USPC ......................................... 707/695, 705, 791
See application file for complete search history.

(56) References Cited

U.S. PATENT DOCUMENTS

| | | | | |
|---|---|---|---|---|
| 6,631,386 B1* | 10/2003 | Arun et al. | ................. | 1/1 |
| 6,931,590 B2* | 8/2005 | Kanie et al. | ................. | 715/234 |
| 7,484,171 B2* | 1/2009 | Jeon et al. | ................. | 715/229 |
| 7,587,415 B2* | 9/2009 | Gaurav et al. | ................. | 1/1 |
| 7,784,026 B1* | 8/2010 | Wong | ................. | 717/109 |
| 8,347,205 B2* | 1/2013 | Karim et al. | ................. | 715/229 |
| 2002/0002567 A1* | 1/2002 | Kanie et al. | ................. | 707/513 |
| 2002/0123878 A1* | 9/2002 | Menke | ................. | 704/2 |
| 2002/0143523 A1 | 10/2002 | Balaji et al. | ................. | 704/8 |
| 2002/0152063 A1* | 10/2002 | Tokieda et al. | ................. | 704/2 |
| 2002/0174196 A1* | 11/2002 | Donohoe et al. | ................. | 709/219 |
| 2003/0014237 A1* | 1/2003 | Macklin | ................. | 704/2 |
| 2003/0046317 A1* | 3/2003 | Cseri et al. | ................. | 707/513 |
| 2004/0068411 A1* | 4/2004 | Scanlan | ................. | 704/277 |
| 2004/0083479 A1* | 4/2004 | Bondarenko et al. | ........ | 719/310 |
| 2004/0143791 A1* | 7/2004 | Ito et al. | ................. | 715/513 |
| 2004/0186841 A1* | 9/2004 | Heuer et al. | ................. | 707/100 |
| 2004/0267803 A1 | 12/2004 | Zhou et al. | ................. | 707/102 |
| 2005/0033617 A1* | 2/2005 | Prather et al. | ................. | 705/7 |
| 2005/0102253 A1 | 5/2005 | Wu et al. | | |
| 2005/0144198 A1* | 6/2005 | Bergstraesser et al. | ...... | 707/203 |
| 2005/0182778 A1* | 8/2005 | Heuer et al. | ................. | 707/101 |

(Continued)

FOREIGN PATENT DOCUMENTS

EP            1258819 A     11/2002

OTHER PUBLICATIONS

Boer, Alexander, et al., "METALex: Legislation in XML", Legal Knowledge and Information Systems, The Fifteenth Annual Conference, Amsterdam, IOS Press, pp. 1-10, Jun. 2002.

(Continued)

*Primary Examiner* — Thanh-Ha Dang

(74) *Attorney, Agent, or Firm* — Fitzpatrick, Cella, Harper & Scinto

(57) ABSTRACT

Coding information representing several versions of a content. Determining is performed by determining a structure comprising content items, and a plurality of versions of the content associated with the structure. Associating is performed by associating, with each content item of the structure, each value of the content associated with the item, in a version of the content, to provide a piece of association information. Coding is performed by coding a single file comprising a piece of information representing the association, the structure and the values of the versions of the content that is associated with the content items.

31 Claims, 12 Drawing Sheets

(56) References Cited

U.S. PATENT DOCUMENTS

| | | | |
|---|---|---|---|
| 2005/0278616 A1* | 12/2005 | Eller | 715/513 |
| 2006/0004738 A1* | 1/2006 | Blackwell et al. | 707/4 |
| 2006/0004858 A1* | 1/2006 | Tran et al. | 707/104.1 |
| 2006/0059465 A1* | 3/2006 | Kogan et al. | 717/121 |
| 2006/0206523 A1* | 9/2006 | Gaurav et al. | 707/104.1 |
| 2006/0212467 A1* | 9/2006 | Murthy et al. | 707/101 |
| 2007/0038982 A1* | 2/2007 | Andrews et al. | 717/124 |
| 2007/0118801 A1* | 5/2007 | Harshbarger et al. | 715/730 |
| 2007/0150525 A1* | 6/2007 | Idicula et al. | 707/203 |
| 2007/0208752 A1* | 9/2007 | Khaladkar et al. | 707/10 |
| 2008/0028199 A1* | 1/2008 | Armstrong et al. | 713/1 |
| 2008/0052616 A1* | 2/2008 | Kano et al. | 715/236 |
| 2008/0077848 A1* | 3/2008 | Roberts | 715/229 |
| 2008/0082907 A1* | 4/2008 | Sorotokin et al. | 715/210 |
| 2008/0098001 A1* | 4/2008 | Gupta et al. | 707/10 |
| 2008/0148141 A1* | 6/2008 | Heuer et al. | 715/234 |
| 2008/0195692 A1* | 8/2008 | Hayosh et al. | 709/202 |
| 2008/0250055 A1 | 10/2008 | Ruellan et al. | 707/102 |
| 2008/0294980 A1* | 11/2008 | Thienot et al. | 715/242 |
| 2010/0180195 A1* | 7/2010 | Behrens et al. | 715/234 |

OTHER PUBLICATIONS

Frimannson, Asgeir, "Adopting Standards Based XML File Formats in Open Source Localisation", Thesis, Faculty of Information Technology School of Software Engineering and Data Communications, Queensland University of Technology, IOS Press 2005.

* cited by examiner

```
<interface>
    <button>
        Open
    </button>
    <button>
        Close
    <button>
    <icon src=
        'picture.png' />
    <button>
        Option
    </button>
    <button>
        Colour
    </button>
</interface>
```
805

```
<interface>
    <button>
        CONTENT
    </button>
    <button>
        CONTENT
    <button>
    <icon src=
        CONTENT />
    <button>
        CONTENT
    </button>
    <button>
        CONTENT
    </button>
</interface>
```
810

| Identifier | Byte |
|---|---|
| Start Document<br>End Document | 0000<br>0000<br>0000<br>0001 |
| Start Element<br>Attribute<br>End Element | 1000<br>0000<br>1100<br>0011<br>1111<br>0000 |
| Start Element<br>(Reference) | 1100<br>0000 |
| Text | 0000<br>1000 |

825

| | |
|---|---|
| Start Document | 0000 0000 |
| Start Element – Length:9 – Name: interface | 1000 0000 – 0000 1001 – interface |
| Start Element – Length: 6 – Name: button | 1000 0000 – 0000 0110 – button |
| Text | 0000 1000 |
| End Element | 1111 1111 |
| Start Element – Reference: button | 1100 0000 – 0000 0001 |
| Text | 0000 1000 |
| End Element | 1111 1111 |
| Start Element – Length: 5 – Name: icon | 1000 0000 – 0000 0101 – icon |
| Attribute – Length: 3 – Name: src | 1100 0011 – 0000 0011 - src |
| End Element | 1111 1111 |
| Start Element – Reference: button | 1100 0000 – 0000 0001 |
| Text | 0000 1000 |
| End Element | 1111 1111 |
| Start Element – Reference: button | 1100 0000 – 0000 0001 |
| Text | 0000 1000 |
| End Element | 1111 1111 |
| End Element | 1111 1111 |
| End Document | 0000 0001 |

| Identifier | Byte |
|---|---|
| Simple type | 0000 0000 |
| Complex type | 1111 0000 |
| Standard | 0000 0000 |
| Single value | 1000 0000 |
| Standard string | 1111 0000 |
| Reference | 0000 1111 |

850

| English (UK) | English (US) | French | Spanish |
|---|---|---|---|
| Open | Open | Ouvrir | Abrir |
| Close | Close | Fermer | Cerrar |
| picture.png | picture.png | picture.png | picture.png |
| Option | Option | Option | Opción |
| Colour | Color | Couleur | Color |

855

| Complex type – 2 versions | EN-UK |
|---|---|
| Simple type | EN-US |
| Simple type | FR |
| Simple type | SP |

| Type | English (UK) | English (US) | French | Spanish |
|---|---|---|---|---|
| Standard | Single value<br>Standard string<br>Length: 4<br>Open | | Standard string<br>Length: 6<br>Ouvrir | Standard string<br>Length:5<br>Abrir |
| Standard | Single value<br>Standard string<br>Length : 5<br>Close | | Standard string<br>Length: 6<br>Fermer | Standard string<br>Length: 6<br>Cerrar |
| Single value | Standard string<br>Length : 11<br>picture.png | | | |
| Standard | Single value<br>Standard string<br>Length : 6<br>Option | | Reference<br>Index: 7 | Standard string<br>Length : 6<br>Opción |
| Standard | Standard<br><br>Standard string<br>Length : 6<br>Colour | Standard string<br>Length : 5<br>Color | Standard string<br>Length : 7<br>Couleur | Reference<br>Index: 10 |

METHOD AND DEVICE FOR CODING AND DECODING INFORMATION

The present invention concerns a method and device for coding and decoding information. It applies, in particular, to document description using XML syntax.

XML (acronym for "Extensible Markup Language") is a syntax for defining computer languages. XML makes it possible to create languages that are adapted for different uses but which may be processed by the same tools.

An XML document is composed of elements, each element starting with an opening tag comprising the name of the element (for example: <tag>) and ending with a closing tag which also comprises the name of the element (for example </tag>). Each element can contain other elements or text data. An element may be specified by attributes, each attribute being defined by a name and having a value. The attributes are placed in the opening tag of the element they specify (for example <tag attribute"value">).

XML syntax also makes it possible to define comments (for example "<!--Comment-->") and processing instructions, which may specify to a computer application what processing operations to apply to the XML document (for example "<?myprocessing?>").>>).

It is considered here that XML data are described in terms of "items", each item being able to be a start element (<tag>), an end element (</tag>), an attribute, a text content, a comment or a processing instruction.

Several different XML languages may contain elements of the same name. To be able to mix several different XML languages, an addition has been made to XML syntax making it possible to define "Namespaces". Two elements are identical only if they have the same name and are situated in the same namespace. A namespace is defined by a URI (acronym for "Uniform Resource Identifier"), for example "http://canon.crf.fr/xml/mylanguage". The use of a namespace in an XML document is via the definition of a prefix which is a shortcut to the URI of that namespace. This prefix is defined using a specific attribute (for example "xmlns:ml="http://canon.crf.fr/xml/mylanguage" associates the prefix "ml" with the URI "http://canon.crf.fr/xml/mylanguage"). Next, the namespace of an element or of an attribute is specified by having its name preceded by the prefix associated with the namespace followed by ':' (for example '<ml:tag ml:attribute="value">').

XML has numerous advantages and has become a standard for storing data in a file or for exchanging data. XML makes it possible, in particular, to have numerous tools for processing the files generated. Furthermore, an XML document may be manually edited with a simple text editor. Moreover, as an XML document contains its structure integrated with the data, such a document is very readable even without knowing the specification.

The main drawback of the XML syntax is to be very prolix. Thus the size of an XML document may be several times greater than the inherent size of the data. This large size of XML documents thus leads to a long processing time when XML documents are generated and especially when they are read.

To mitigate these drawbacks, methods for coding an XML document have been sought. The object of these methods is to code the content of the XML document in a more compact form, but enabling the XML document to be easily reconstructed. However, most of these methods do not maintain all the advantages of the XML format.

Among these methods, the simplest consists of coding the structural data in a binary format instead of using a text format. Furthermore, the redundancy of the structural information in the XML format may be eliminated or at least reduced (for example, it is not necessarily useful to specify the name of the element in the opening tag and the closing tag).

Another method is to use an index table, in particular for the names of elements and attributes which are generally repeated in an XML document. Thus, at the first occurrence of an element name, it is coded normally in the file and an index is associated with it. Next, for the following occurrences of this element name, the index is used instead of the complete string, reducing the size of the document generated, but also facilitating the reading: there is no longer need to read the complete string in the file and the determination of the read element may be carried out by a comparison of integers instead of a comparison of strings of characters.

Lastly, beyond these elementary methods, there are more highly developed methods consisting in particular of taking into account more structural information in order to further compress the data. The case of Efficient XML may be cited, which is a format used as a basis for the standardization of a binary XML format by the EXI group of W3C, which takes into account the order of appearance of the different items within a document to construct a grammar which makes it possible to code the most frequent items using a small number of bits. Another way structural information is taken into account is by detecting structural patterns adapted to represent the data.

In a certain number of cases, text data exist in several versions and are stored in structured data form (for example in XML).

For example, the localization of data consists of adapting a text to a given public. The localization may consist of translating a text, but also of modifying a time depending on a geographical region or of converting money from one currency to another. The case of different languages is mainly dealt with here. However, it is noted that the invention applies to any form of structured data that exists in several versions. This may in particular be the case for files describing user profiles (the structure of the profile is always the same, but the content differs), or for SVG files (SVG being an acronym for "Scalable Vector Graphics"), which describe lines and curves, geometric shapes and animations in a structured format, and for which two files may share the same structure but have different contents.

The case may also be mentioned of documents corresponding to two different versions of the same standard (for example SOAP 1.1 and SOAP 1.2) for which the structure may be identical but the contents different. Lastly, in the case in which the content of a structured document is modified, there are several contents for the same structure.

When there are structured data in several versions (for example two XML documents describing the same interface, one containing text in English and the other in French), the storage of the data and the access to the information are not optimal: more particularly the information on structures is redundant since the same data are described, and only the contents change. Furthermore, as the reading of XML data is not efficient, the access to the information contained in the different files is not fast. Moreover, the fact of having several files makes the maintenance of the files difficult: if it is necessary to modify a part of the structure, it is necessary to perform the same modification in all the files, which has high risks of error (differences in the structure of the different documents, which are however supposed to describe the same data).

A first solution that may be envisaged in order to keep only one file consists of integrating the different files into the same document. However, this solution does not enable the structural redundancy to be eliminated since it is necessary to add mark-up information to take into account the different versions in the same document, and, due to the use of XML the access to the information remains of low efficiency.

A second solution consists of using only one structured file, that file that does not contain a version of the content but references to values appearing in a catalog, typically a database. An index is associated with each attribute and with each text content, and by virtue of a function which knows that index and a content version, it is possible to interrogate the catalog and obtain the value corresponding to that index for the chosen version. This type of mechanism is in particular described in the document US 2002/0143523, in which the main application consists of displaying a version of a web site that is adapted to a given public.

The document US 2004/0267803 describes a method in which parts to translate are defined in an XML document. Once those parts have been defined, the structure of the document is extracted on one side and the strings to translate on the other, then the strings in question are translated, and a file is then created for each content version by inserting the strings into the structure. This method is not however satisfactory since there are still several files, which complicates the maintenance and attenuates performance, in terms of access to the information.

The present invention aims to mitigate these drawbacks.

To that end, according to a first aspect, the present invention concerns a method of coding information representing several versions of a content, characterized in that it comprises:
- a step of determining a structure comprising content items, and a plurality of versions of the content associated with said structure,
- a step of associating, with each content item of said structure, each value of the content associated with said item, in a version of the content, to provide association information and
- a step of coding a single file comprising a piece of information representing said association, said structure and said values of the versions of the content that is associated with the content items.

The present invention thus provides a method for creating a single file containing the data in a non-redundant form, it being possible to read this file efficiently Thus, while profiting from fast access to the data, the risks of having structurally different versions are reduced and the maintenance rendered easier.

By concentrating the data into a single file, it is much easier to manage the synchronization of the different content versions than with dispersed resources. Thus, even if not all the versions contain information, there is no risk, when editing the file, of ending up with a version liable to cause errors. In the case of different languages, at worst, access is obtained to the default version. If the person who modifies the structure does not know all the versions, or translations, it will be possible for another person to take the file and modify the default value with the appropriate version or translation.

According to particular features, during the coding step, the single file is coded in a binary format for coding a structured document.

According to particular features, the information that represents several versions of a content comprising at least one element having a name or at least one attribute having a name, at least one element name or attribute name is treated as a content item.

In this case, the XML document becomes fully translatable.

According to particular features, during the associating step, the association information comprises, for at least one content item, a type indicating the nature of the content item and a content.

According to particular features, the coding method as succinctly set forth above comprises a step of comparing said type with a predetermined type list and, if said type does not appear in said list, for said content item, only a single content version is kept.

It is thus specified that the comments or instructions only possess a single version and the coding is lightened.

According to particular features, during the step of coding the single file, said single file represents each association between versions of contents and items with, in the single structure, a list that references, for each item having a content, the different available versions of said content.

It is thus not necessary to read all the values at the start, the reading of the list of values being carried out at the time of reading each item having a content. This variant is particularly adapted to a format for random access to the data.

According to particular features, during the step of coding a single file, said single file represents each association between versions of contents and items with, on the one hand, a structure and, on the other hand, a contents table giving the list, for each version, of the different values and, for each item having a content, the different versions, each content item being identified by a specific index and coding is carried out, first of all, of the contents table, and then of the structure.

This makes it possible, on decoding, first of all to read all the content versions then to read the structure efficiently.

According to particular features, during the step of coding the single file, to code the content items, an index of the item is coded, said index indicating what list of values to consider on decoding, from among a plurality of lists corresponding to the different versions of the content.

According to particular features, during the step of coding the single file, coding is carried out of at least one recursive list of values, values forming sub-lists of said recursive list of values.

This property is important in the case in which families of versions are defined, for example for different local linguistic variants.

According to particular features, during the associating step, at least one version is defined by reference to another version.

A family of versions is thus obtained, which makes it possible to optimize the coding.

According to particular features, the information that represents several versions of a content comprising a plurality of documents, during the step of determining a structure comprising content items, a step is carried out of comparing structures of at least two of said documents without taking into account the contents.

According to particular features, further to the comparing step, if the structures differ, a step of uniformization of said structures is carried out.

According to particular features, during the associating step, a type is determined that is associated with each content item, from a type signifying that the item takes a single value and at least one type signifying that the item takes a value from a list of values, said list of values being formed during said associating step.

According to particular features, the types comprise at least one type indicating that the list comprises sub-lists.

According to a second aspect, the present invention concerns a method of decoding information, characterized in that it comprises:
- a step of decoding a single file representing a structure comprising content items, a plurality of versions of the content associated with said structure and a piece of information representing an association, with each content item of said structure, of each value of the content associated with said item, in a version of the content, to obtain said structure and, for at least one version identified in said request, the association information and the version of the content of each content item and
- a step of associating said structure with, for the version identified in said request, the content value of each content item.

According to particular features, the decoding method as set forth succinctly above further comprises:
- a step of receiving a request for transmission of a version of a content to an application, and
- a step of supplying said version of the content to said application.

According to particular features, during the step of receiving a request, an XML interface is used.

The integration of the present invention is thus particularly easy.

According to a third aspect, the present invention concerns a device for coding information representing several versions of a content, characterized in that it comprises:
- a means for determining a structure comprising content items, and a plurality of versions of the content associated with said structure,
- a means for associating, with each content item of said structure, each value of the content associated with said item, in a version of the content, to provide association information and
- a means for coding a single file comprising a piece of information representing said association, said structure and said values of the versions of the content that is associated with the content items.

According to a fourth aspect, the present invention concerns a device for decoding information, characterized in that it comprises:
- a means for decoding a single file representing a structure comprising content items, a plurality of versions of the content associated with said structure and a piece of information representing an association, with each content item of said structure, of each value of the content associated with said item, in a version of the content, to obtain said structure and, for at least one version identified in said request, the association information and the version of the content of each content item and
- a means for associating said structure with, for the version identified in said request, the content value of each content item.

According to a fifth aspect, the present invention concerns a computer program loadable into a computer system, said program containing instructions enabling the implementation of the method of coding and/or of the method of decoding of the present invention as succinctly set forth above.

According to a sixth aspect, the present invention concerns an information carrier readable by a computer or a microprocessor, removable or not, storing instructions of a computer program, characterized in that it enables the implementation of the method of coding and/or of the method of decoding of the present invention as succinctly set forth above.

As the advantages, objectives and features of this decoding method, of this coding device, of this decoding device, of this computer program and of this information carrier are similar to those of the coding method of the present invention, as succinctly set forth above, they are not reviewed here.

Other advantages, objectives and features of the present invention will emerge from the following description given, with an explanatory purpose that is in no way limiting, with reference to the accompanying drawings, in which.

Figure 10:
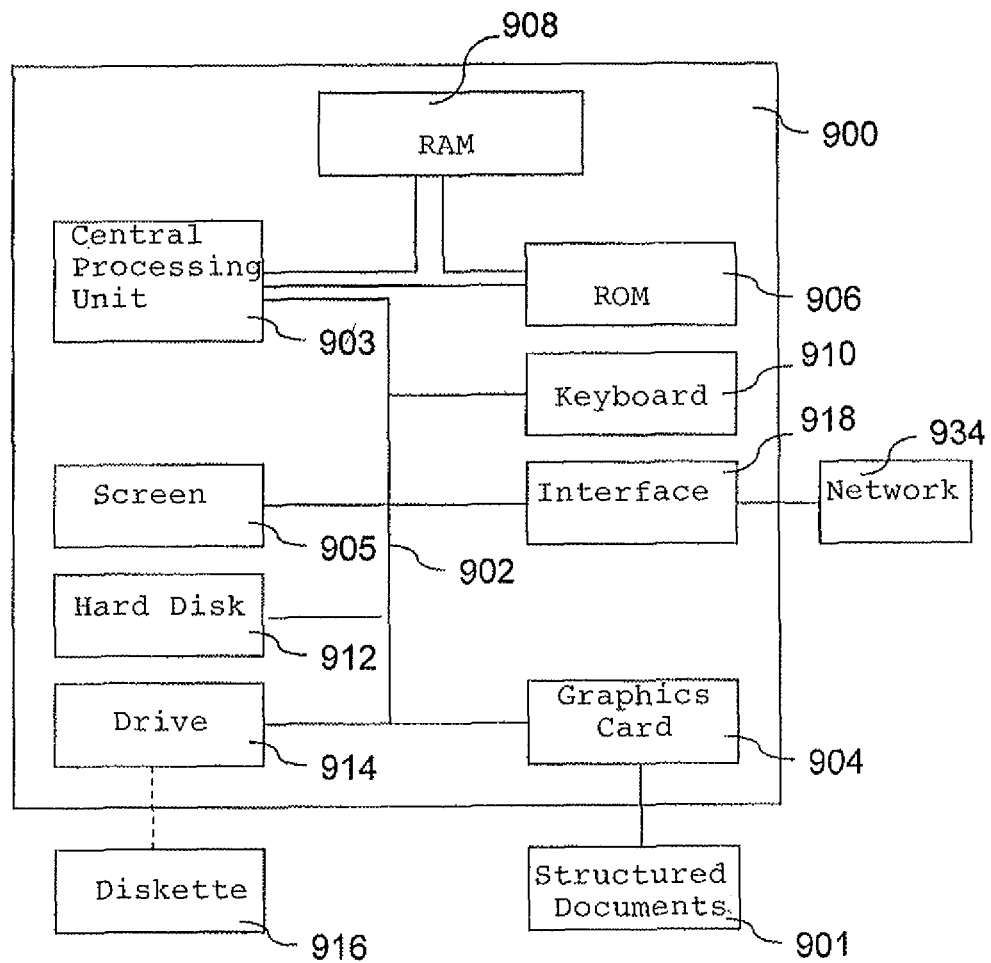

FIGS. 8, 9A and 9B present an example of an XML document, different content versions and a coded file example and FIG. 10 is a diagram of a particular embodiment of the device of the present invention.

The present invention implements a binary format for coding a structured document in XML format in the embodiments described and represented. It is to be noted that there are different binary XML formats and that the present invention is limited neither to XML nor to a binary format. With binary XML, an XML document is coded in binary form, which reduces its size and thus enables the reading of the data to be accelerated. Each item of the XML document is coded with an item type (element start, element end, attribute, text, comment, processing instruction), possibly a name (element or attribute) and possibly a content (attribute value, text value, comment value, processing instruction value). When there is a structure and several content versions, each item having a content is associated with the different values that the content takes in each of the content versions, and those associations are coded in a binary XML format.

Subsequently, on decoding, a content version is selected and when an item having a content is decoded, that version is searched for among the different associated values. For an application, the communication with the decoder is made via an XML interface of known type, and easy integration results therefrom.

Concerning the content versions, not all the items having a content are worth considering. More particularly, the comments or the processing instructions have little chance of appearing in several versions, in contrast to the attribute values or the text content. Thus, in some embodiments, a list of item types is specified for which several versions are to be taken into account, a comparison is made of each item type encountered with the content of said list and, for the items having a content but not appearing in that list, a single version is kept.

Furthermore, the names of elements or of attributes may be treated as content values. In this case, the XML document becomes fully translatable.

Figure 1:
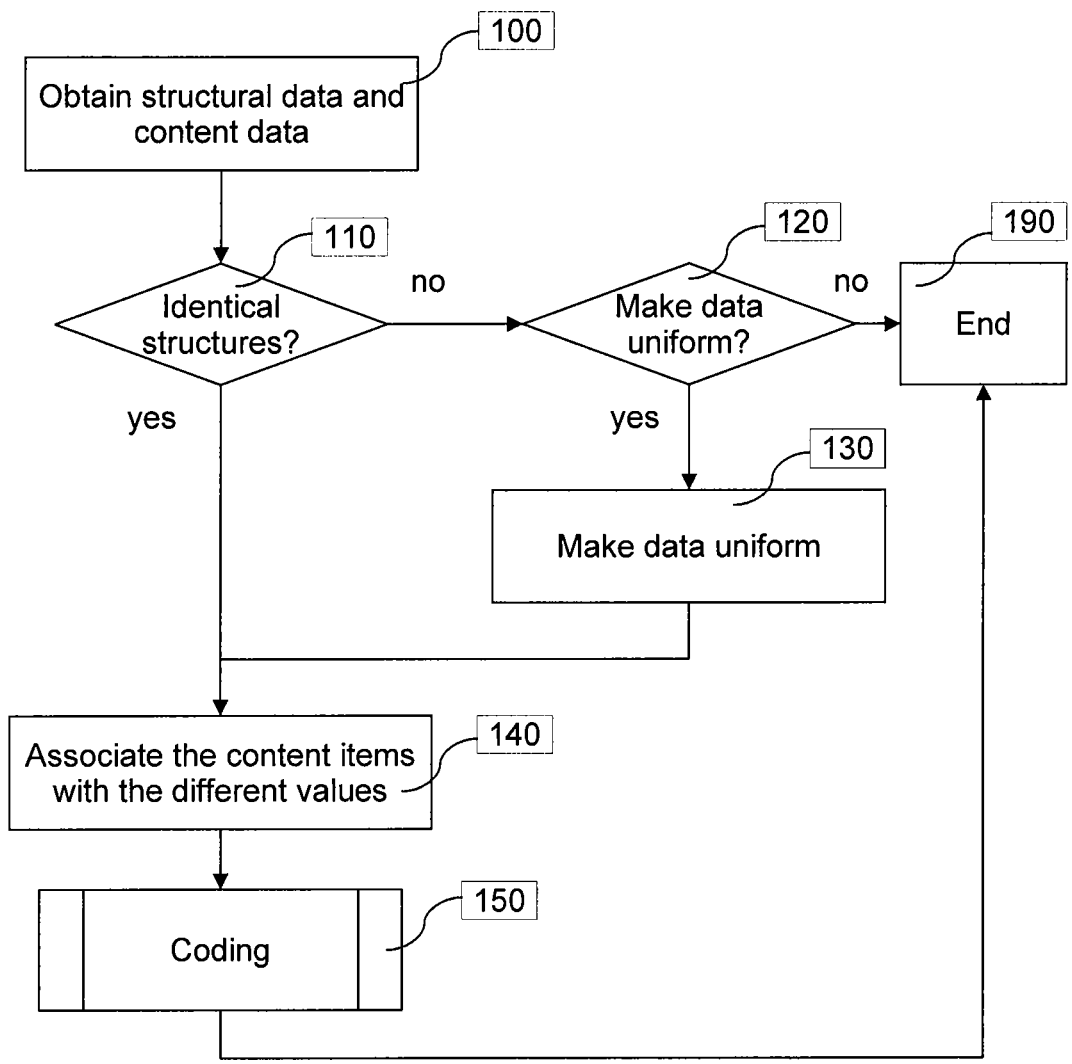
FIGS. 1 to 3 and FIG. 6A represent, in the form of logigrams, steps implemented in a particular embodiment of the method of coding a single file containing a structure and several content versions of the present invention.

FIG. 1 represents different steps of creating a file comprising a structure and several content items associated with that structure. During a step 100, structural data and content data are obtained. This obtainment may be made via a graphical interface, the user selecting a list of documents to open, those documents being supposed to have the same structure but different contents (for example contents in French for a first document and in English for a second). In the case of contents in several languages, the user specifies, for each set of data, the version or language which it correspond to. Among the versions, there is a default version: if no version is specified, this is the first version submitted. A version may also be defined by reference to another version, and a family of versions is thus obtained. An example of a family of versions, in the case of different languages, concerns the English language: British English, American English, Canadian English. The definition of family is advantageously used on coding the file, as described with reference to FIG. 3.

Next, during a step 110, the structures of the different documents are compared. The comparison of structured documents is a known problem (for XML, "xml diff" is referred to), and it is a matter here of comparing the documents without taking into account the contents. Where the structures differ, it is decided during a step 120 whether it is desired to make the structures uniform. This decision may depend on a parameter of the application for file creation, or the user may be directly asked to choose. If it is not decided to make them uniform, the processing terminates during a step 190. To be precise, the creation of the file grouping together the contents for the same structure implies that the structural data are identical from one source to another. If, on the other hand, it is chosen to make the data uniform, during a step 130, the uniformization is carried out by virtue of the information obtained on comparing the structures.

It is to be noted that the uniformization may be made by union, that is to say by taking all the elements of the different structures, or by intersection, that is to say by only taking the elements that are common to the different structures. A simple way to proceed consists of keeping, for each structure part, only that which occurs the most frequently, which may lead to making both unions and intersections.

According to the modifications made on the structure, modifications are also made to the different contents. In the case of the addition of an item having a content, a default content value is added to the corresponding data. There is necessarily a default value since, if an addition is made, that addition corresponds to at least one of the structures, and content data are associated with that structure. This reference to the default value may be modified later. In the case of deletion of an item that was rejected on uniformization, for example when this is made by intersection, said item having a content, the corresponding value is also deleted from the corresponding content data.

Figure 2:
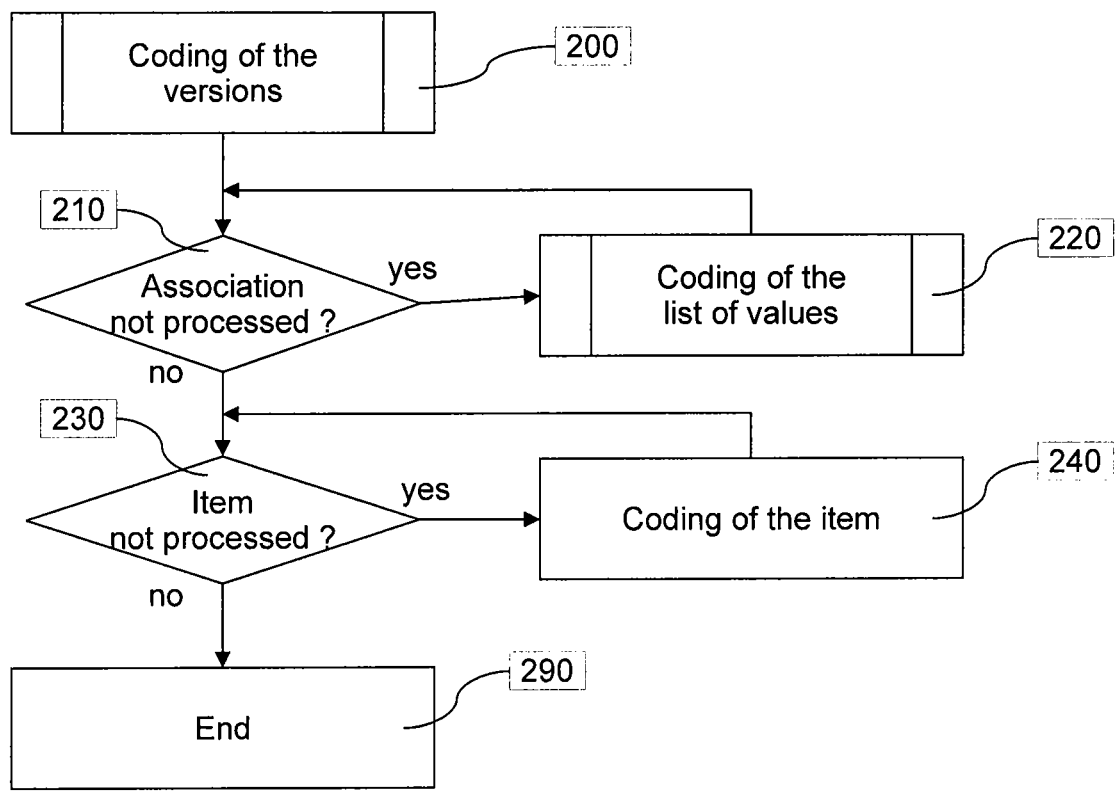

Next, a single structure having been produced, each set of data is traversed and each value is added to the list of the values of the corresponding item during a step 140. Next, the file is coded with the structure and the content associations corresponding to the versions, as illustrated in FIG. 2. The processing terminates at step 190.

It is noted that the associations between versions of contents and items may be kept in different forms. Thus each association may be kept directly in the single structure (for each item having a content, there is a list with the different versions), or else, for example, a table may be made of the contents listing, for each version, the different values and, for each item having a content, the different versions (the item being identified by its index from among the items having a content); such an example of contents table is represented in FIGS. 9A and 9B.

It is also noted that the creation of a file is not necessarily made on the basis of several XML files having the same structure and each defining a different content version. Thus it may be a matter of an XML file and files that are uniquely text, the file representing the structure and the text files the different contents. In this case, the verification of the validity of the structural data, carried out during the step 110, consists of verifying that there are indeed as many content items in the structure as there are content values in each of the text files. Another possible embodiment consists of opening a first XML document then of choosing to create a new version, and the user may then enter the translated values one by one. In one embodiment, the user provides an XML file and a set of versions and the application creates the sets of contents that are adapted to the versions considered (in the case of languages, the application will provide the translation of the different strings of characters). Lastly, a mode of creation by editing a file containing several versions of contents is described in FIG. 7.

Figure 6A:
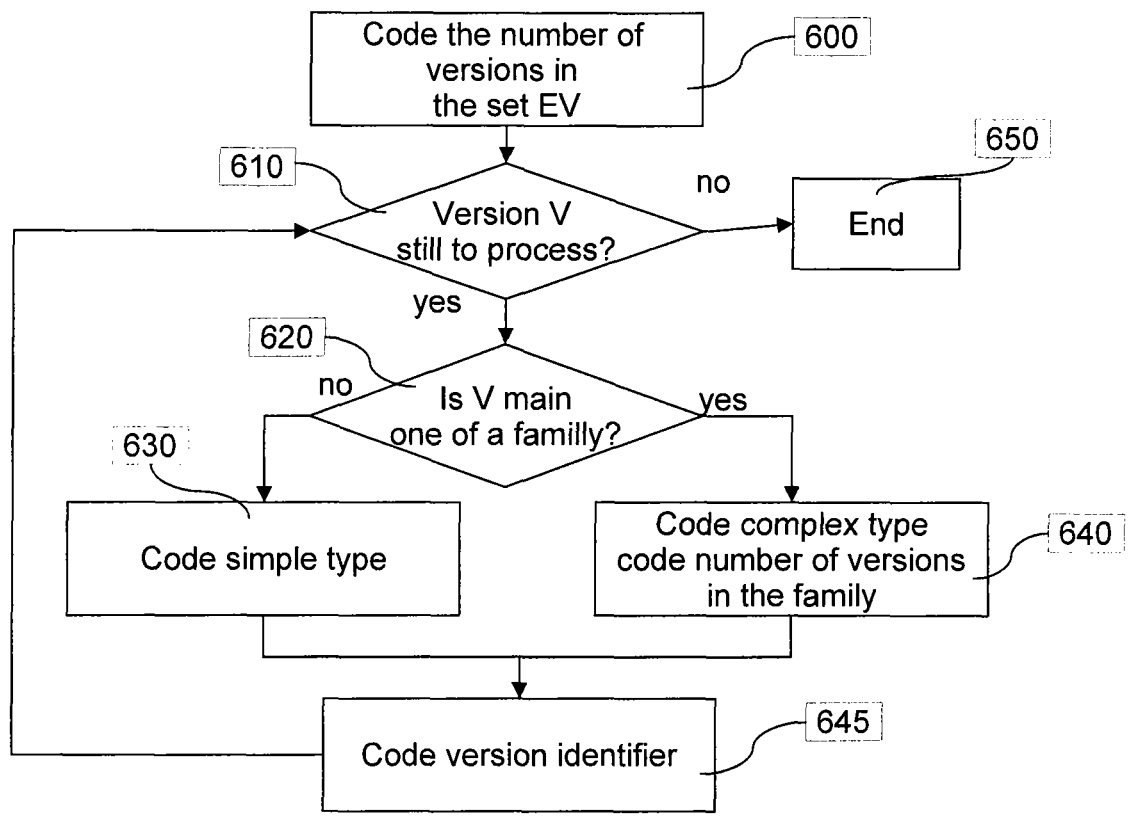

FIG. 2 details the coding of a file, once the structure, the versions and the contents have been determined. During a step 200, versions are coded, as illustrated in FIG. 6A. Next, starting with a step 210, the associations between the items and the content values are processed for each item having a content. To that end, during the step 210, it is determined whether there remains an association that has not been processed. If yes, during a step 220 detailed with reference to 3, the list of values of that association are coded. Otherwise, a step 230 is proceeded to, during which it is determined whether there remains an item not processed in the structure of the document. If yes, that item is coded during a step 240. Otherwise, the processing terminates during a step 290.

The coding of the items is not detailed here and depends on the binary XML format adopted. Typically, for each type of item, a different identifier is used (a simple solution consists of using one byte for each identifier, but is solution is not optimal). The identifier may also be contextual and depend on the items encountered previously in the document (attribution of short identifiers so as to optimize the compression).

The coding method described here first of all codes the values and then the structure: this makes it possible, on decoding, first of all to read all the content versions and then to read the structure efficiently. A variant consists of coding the lists of values not at the start of the document but directly after each item having a content. In this case, it is not necessary to read all the values at the start, it being at the time of reading each item having a content that the list of values will have to be read. This variant is particularly adapted to a format for random access to the data. Another possibility concerning the coding of the content items consists of specifying the index of the item that is coded, that index enabling it to be known what list of values to consider on decoding, however, it is more advantageous not to code this information and to leave to the decoder the task of knowing what the index is of the item that it decodes.

Figure 3:
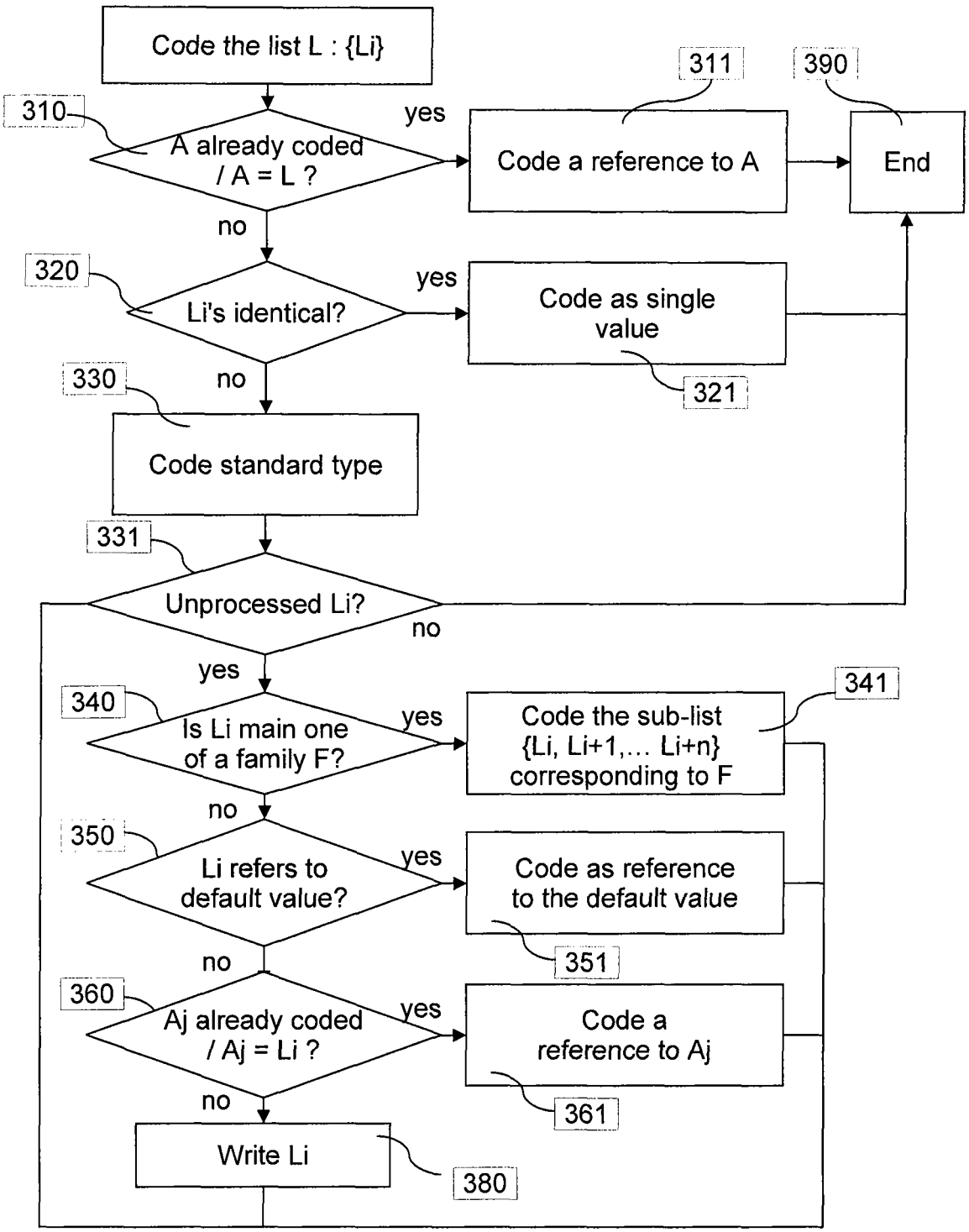

FIG. 3 describes the coding of a list L of values Li, these values being different versions of the same content, all these values consequently being associated with the same item.

Although there is only one list L of values Li for a given item, that list of values Li may be recursive, that is to say that a series of values Li may form a sub-list of L. This property is important where families of versions are defined.

If the example is taken of a content in several languages, it will be possible to associate British English and American English within the same family. Within a family, the probability of having identical contents is high, and it is thus advantageous to take this factor into account when coding the information.

The coding of the list L commences at a step 310 during which it is determined whether there is a list A that has already been coded such that A is identical to L. If yes, during a step 311, a reference to A is coded then the processing terminates during a step 390. The coding of the reference, like the coding of any list, commences by the specification of a type, here the "reference" type. Next, a number is coded, this number enabling it to be known what list A is referred to. For example, if A is the third list coded, the figure "2" may be written, as the indexes commence with the value "0".

If there is no list A already coded such that A is identical to L, during a step 320, the values Li are compared to determine whether they are identical with each other. If yes, the list L is coded with the "single value" type, then by specifying this value, during a step 321. The value may be coded either by writing the string in question, or by reference to a string already encountered if one exists that is identical to the string which it is desired to code.

If the values of Li are not identical, the list is coded, during a step 330, with the "standard" type, as the list dies not have a particular property, that is to say that a binary identifier is written corresponding to the information "standard type", this information making it possible to know on decoding that a list of values follows. The values Li are then processed one by one. To that end, the first value Li is considered during the step 330. Next, during a step 331, it is determined whether a value Li remains that has not been processed. If yes, it is examined whether Li corresponds to the main version of a family, during a step 340. This information is known on the basis of the set of versions to process. If it is the case, during a step 341, coding is performed of the sub-list corresponding to that family of versions, and the processing resumes at step 331 with the value Li+n+1, if it exists, where n represents the number of values in the sub-list of the family of versions. If the value Li is not the main value of a family F, it is determined whether the value Li makes reference to the default value of L, during a step 350. This case arises, for example, when addition of an item having a content is necessary to make the structures uniform, as set forth with reference to FIG. 1. This is because there is at least one version of the content data for which there is no value corresponding to that item, otherwise there would have been no need for uniformization. By default, there is added, in parallel to the addition of the structural item, a reference to the default value in the content data. If Li is a reference to the default value of L, the "default" type is coded during a step 351, then the processing is resumed at step 331.

If Li is not a reference to the default value, Li is compared during a step 360 to the different values Aj already coded. If there is a value Aj that is identical to Li, during a step 361, Li is coded as a reference to Aj, "reference" type, then index of Aj, and the following value Li is considered, if it exists, to return to step 331. Otherwise, during a step 380, Li is directly written ("standard" type, length of the string, and string itself and the processing is resumed at step 331 with the following value Li, if it exists. When all the values Li have been processed, the processing terminates at step 390.

Figure 4:
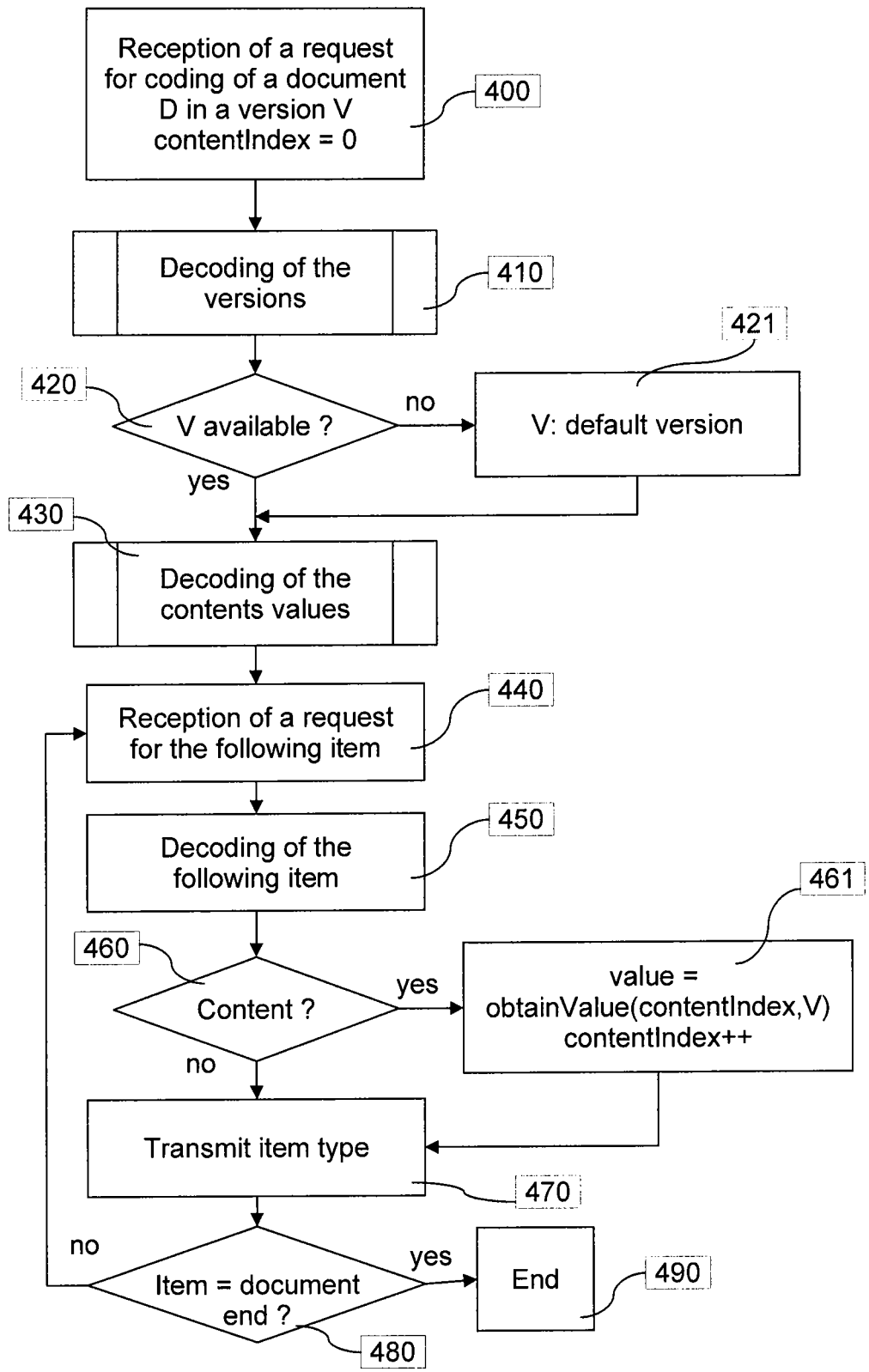
FIGS. 4, 5 and 6B represent, in the form of logigrams, steps implemented in a particular embodiment of the method of decoding a file containing a structure and several content versions of the present invention.

FIG. 4 presents the decoding of a coded document implementing the steps described in FIGS. 1 to 3 and 6A.

The decoding is carried out by a decoder at the request of an external application. This application interacts with the decoder according to the conventional interfaces to decode a structured document. The interface described here corresponds to what is named "StAX" (acronym of "Streaming API for XML"), that is to say an interface in which it is the application that directs the decoding of the file by requesting the decoder to pass on to the following item. There are other interfaces for reading an XML file, for example "DOM" (acronym for "Document Object Model") and "SAX" (acronym for "Simple API for XML"). These interfaces may also be used to decode the files, the invention not being limited to a particular interface.

To perform the decoding, during a step 400, the decoder receives a request to decode a document "D" in a version "V". The decoder initializes a content index to "0", this index being used to know what index to search for in the content table when an item having a content is encountered. Next, during a step 410, the available versions are decoded, as set forth with reference to FIG. 6B. During a step 420, it is searched to see whether the version V, identified during the step 400, is among the available versions. If not, during a step 421, the version V is modified, which becomes the default version. Further to the step 421 or if the result of step 420 is positive, during a step 430, the decoding is carried out of the values of contents in their different versions, as set forth with reference to FIG. 5. These different versions are kept for the reading of the following portion of the document. To that end, a contents table is constructed, this table making it possible to know the content on the basis of a version and an index.

The reception of a request for decoding the following item, during a step 440, triggers the decoding of the following item, during a step 450. This decoding is performed by analyzing data already read or by reading complementary data. During a step 460, it is determined whether it is an item having a content. If yes, during a step 461, the version V of that content is obtained knowing which string to search for by virtue of the content index and of the selected version V. The content index is then incremented.

During a step 470, whether or not it is an item having a content, the type of the item is transmitted to the application, the application then being able to request the information specific to each type of item, in particular the name of the element if the item is a start element, or the content value if the item has a content. In variants, during the step 470, the item type is compared to a list of item types for which several versions are to be taken into consideration and, for the items for which the type does not appear in that list, only one version is kept. It is thus specified that the comments or instructions only possess a single version and the coding is lightened.

During a step 480, it is determined whether the item is the end of the document. If yes, the processing terminates during a step 490, the file being entirely decoded. Otherwise, step 440 is returned to while awaiting a request for the following item.

In the variant of the coding method described with reference to FIG. 2, it is possible to code the different contents directly after each item having a content. In this case, there is no contents table at the start of the document, and this step 430 is replaced by reading the contents at the time of the decoding of each item having a content.

Figure 5:
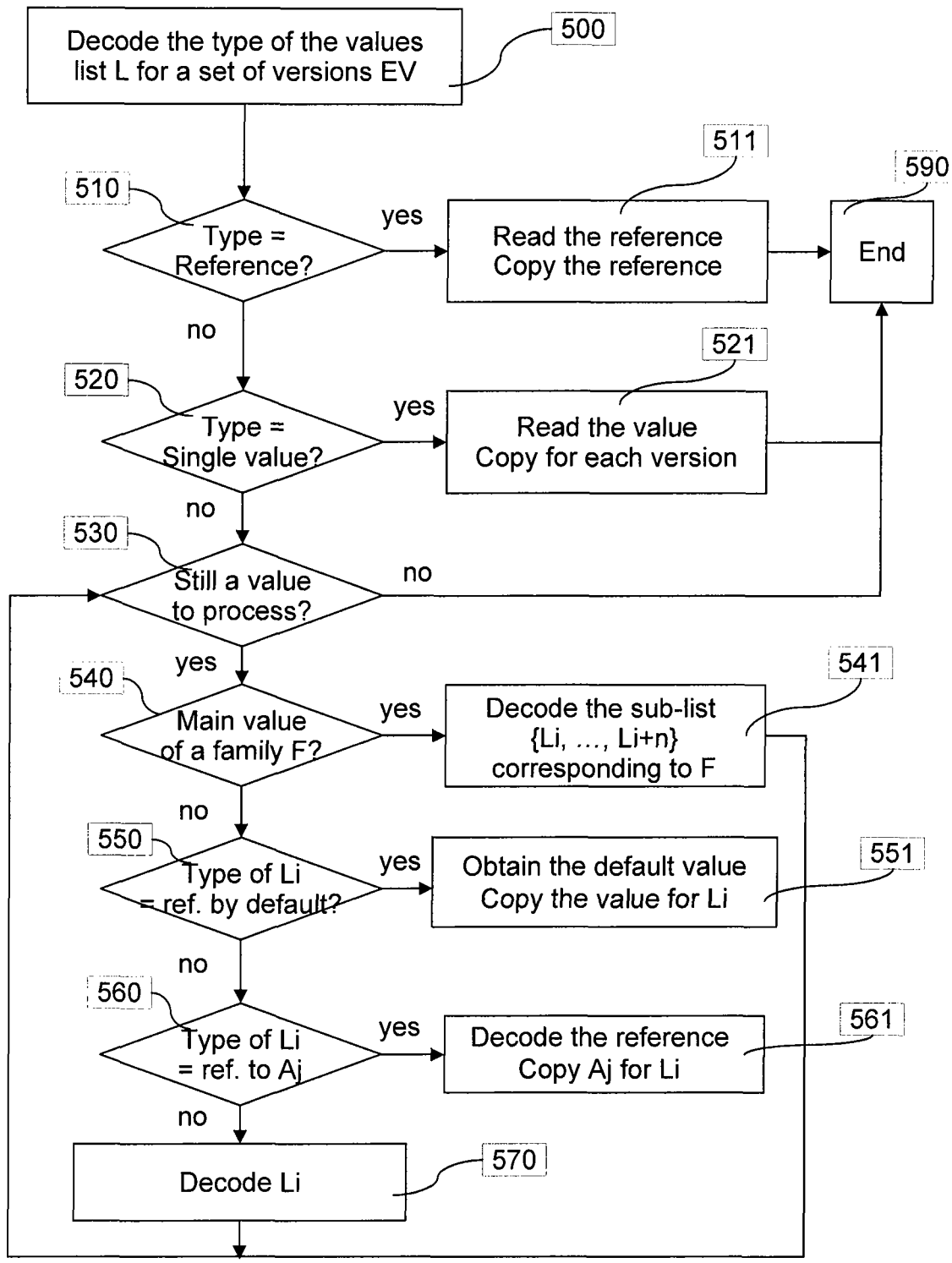

FIG. 5 describes the decoding of a set of values Li of a list L corresponding to a set of versions "EV". The processing commences, during a step 500, by the obtainment of the decoded list type. Next, during a step 510, it is determined whether this type is that of a "reference" to a list. If yes, during a step 511, that reference is read and it is copied. The processing then terminates during a step 590. If the result of step 510 is negative, during a step 520, it is determined whether the type is that of a "single value". If yes, during a step 521, that single value is read and then it is copied for each version in order to construct the list L and the processing terminates during the step 590.

If the result of step 520 is negative, the list of "standard" type. The values are then examined one by one, starting with a step 530. During the step 530, it is determined whether a value to process remains. If not the processing ends at step 590. If yes, during a step 540, it is determined whether, according to the list of the versions, it is a main value for a family F. In the affirmative, the sub-list associated with the family F is decoded, during a step 541, then step 530 is returned to.

If the value is not a main value for a family, during a step 550, it is determined whether it is a reference to the default value for the current list. If yes, that default value is obtained and it is copied for the value in course of decoding, during a step 551, and step 530 is returned to. On the other hand, if the value is not a reference to the default value, during a step 570, the string of the value is decoded directly, and step 530 is returned to.

The processing described with reference to FIG. 5 makes it possible to create a list of values, each value really being a string. Thus, when a string is searched for in a given version, it is immediately accessible. Nevertheless, as a variant, the information on the values is kept as references to other values when they are such references. This variant leads to a more complex processing to access a given value.

Figure 6B:
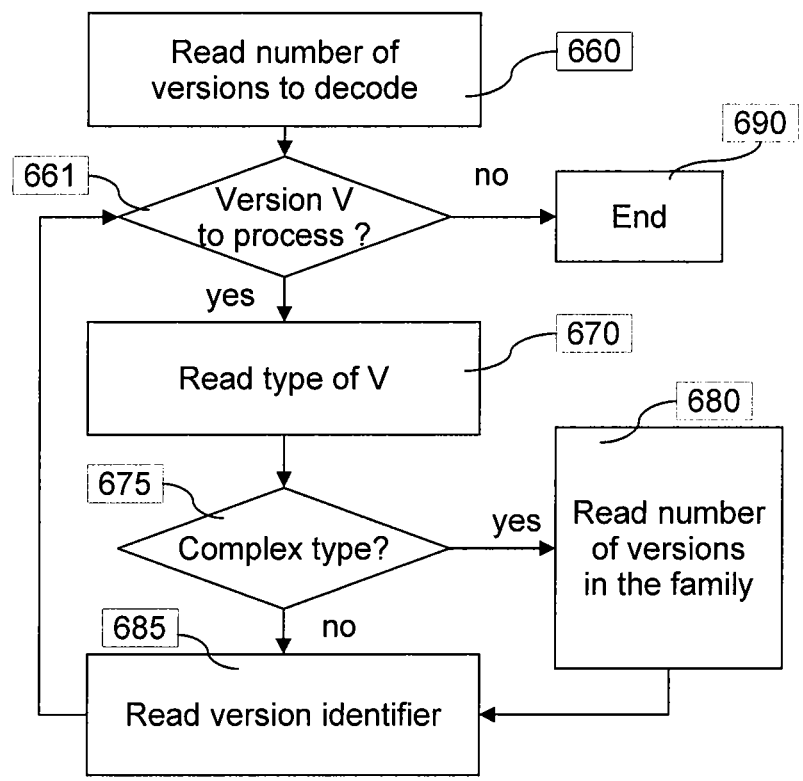

FIGS. 6A and 6B respectively describe the coding and the decoding of the versions contained in a document, a coding example being provided in FIGS. 9A and 9B.

The coding of a set of versions "EV" commences at a step 600 by the coding of the number of versions in the set EV. It is then evaluated, at a step 610, whether a version V remains to process in the set EV. If that is the case, during a step 620, it is determined whether V is the main version of a family of versions. If not, during a step 630, a "simple" type is coded. If yes, during a step 640, a "complex" type is coded, then the number of versions in the family. Further to one or other of the steps 630 and 640, during a step 645, the identifier of the version is coded, then the processing resumes at step 610. When all the versions have been processed, the processing terminates at step 650.

As regards step 645, the coding of the version identifiers may be made via internal identifiers, shared between the coder and the decoder. This solution may enable gains to be obtained in terms of compression of the information. However, it does not ensure interoperability since an application accessing the versions on decoding without knowing their signification would not be able to exploit them correctly. One solution ensuring interoperability consists of using standardized values for the identifiers of versions. In the case of languages, the ISO-639 standard may thus be used, which defines short codes for each language.

As regards the decoding of versions, illustrated in FIG. 6B, it commences, during a step 660, with the reading of the number of versions to decode. Next, during a step 661, it is determined whether a version V to process remains. If that is the case, during a step 670, the type of the version V is read. Then, during a step 675, it is determined whether that type is "complex". If yes, the number of versions is read in the family of versions, during a step 680.

If the result of step 675 is negative or further to step 680, during a step 685, the identifier of the version is read then step 661 is returned to. If, during the step 661, it is determined that all the versions have been processed, the processing terminates, at a step 690.

Figure 7:
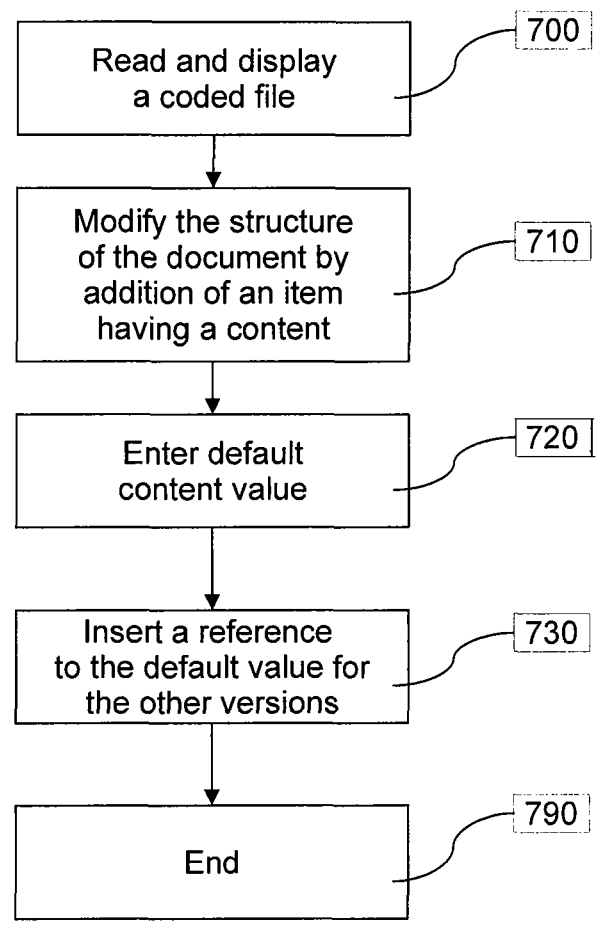
FIG. 7 represents, in logigram form, steps implemented for editing a file containing a structure and several content versions.

FIG. 7 describes the addition of an item having a content, by editing a file coded in advance. This editing is made via a graphical interface. The processing commences during a step 700 during which a binary document containing several content versions is read then displayed. In this graphical interface, one advantageous representation consists in presenting the structure and the different versions of contents, in two separate graphical elements. Next, a user modifies the structure of the document by adding structural information, among which is at least one item having a content, during a step 710.

This modification may be made by directly editing the structure, as a text file is edited, or with tools provided by the graphical interface, for example for the addition of components at a location in the structure. When the item having a content is added, during a step 720, a default value is requested from the user and the latter enters or selects it. This value is then inserted in the default content version and, for the other versions, a reference to that default value is inserted, during a step 730. The processing then terminates during a step 790.

In similar manner, the deletion of an item having a content may be described. However, this operation is simpler since it suffices to delete the value associated with the corresponding to item from all the content versions. The person skilled in the art thus knows how to perform this without it being necessary to further describe it.

One of the advantages given by concentrating the data into a single file is observed here: it is much easier to manage the synchronization of the different content versions than with dispersed resources. Thus, even if not all the versions contain information, there is no risk, when editing the file, of ending up with a version liable to cause errors. In the case of different languages, this makes it possible, in the worst case, to access the default version. If the person who modifies the structure does not know all the translations, it will be possible for another person to take the file and modify the default value with the translation. The localization process is thus rendered easier.

FIG. 8 presents an XML document 805 describing a graphical interface, the structure 810 extracted from that document, the content items being represented by the string "CONTENT", the structure coded in text form 815 and in binary form 820, the text identifiers and their binary form equivalents being noted in a table 825 provided for that purpose.

The coding described is given by way of example. This is coding in relation to bytes (and not in relation to bits) which in particular makes it possible to designate an XML element by reference, when its name has been coded. The reference is a number designating the row in which the element appears in the document. Here, there is a reference "1" for the element "button", a single element appearing before this ("interface").

FIGS. 9A and 9B present content versions 855 that are associated with the structure of FIG. 8, as well as the coding 860 of the versions, the coding 865 of the content data, in text form, an equivalents table 850 enabling the link to be made with the binary form. For each content version, there is a string associated with each of the "CONTENT" values of the structure presented in FIG. 8. Thus, the first version—in British English—corresponds to the values presented in the XML document of FIG. 8. As for FIG. 8, the coding of the versions and of the data is presented here in text form, an equivalents table enabling the link to be made with the binary form.

In this example, four versions are considered: British English, American English, French and Spanish. It may be that each of these versions originally exists in a particular XML document having the structure presented in FIG. 8. British English and American English form the same family, of which British English is chosen arbitrarily as main version. The use of the family makes it possible to group the values together when they are identical within the family. In this example, the manner chosen to code the versions relies on the use of two types: the "simple" type and the "complex" type. A "simple" type only defines a version, whereas a "complex" type defines a number of versions then a version, the number of versions corresponding to the number of following versions which belong to the same family.

In this case, the first type coded is the "complex" type, with two versions, these two versions first of all corresponding to British English then to American English, American English being coded with a "simple" type. Another solution consists not of coding types but of directly coding the number of versions of a given family, then of coding said versions. For example, here there would be:

2: British English, American English;
1: French;
1: Spanish.

However, with such a system, recursivity is lost, that is to say the possibility of having a sub-family within a family, for example different versions according to the American regions.

Once the versions have been coded, the different contents can be specified. In this example, the contents are coded by sets of values corresponding to the same content in the XML structure (for example "Open, Open, Ouvrir, Abrir"). The coding commences with the specification of a type. For the first set of values, the type specified is the standard type. The content associated with the first version is then coded: this is "Open" which is also the content of the second version (this is a case of the same family), and the "Single value" type is therefore used in order to code only one value for the two versions. The coding of the value in itself is made by specifying its length (number of characters), then by writing the value itself. For the French version, the "Standard string" type is used, and similarly for the Spanish version. The coding of the following set of values "Close, Close, Fermer, Cerrar") is based on the same principle.

On the other hand, for the following set of values, there is only one value: "picture.png". Instead of the "standard" type, the "Single value" type is used, then that value is coded only once. The following set of values is, like the first two, "standard", however there is a difference in the coding of the value "Option" for the French version: this is because the value "Option" has already been coded, and rather than coding it a second time, reference is made to it using the "Reference" type then by specifying the index of the coded string to which reference is made. As "Option" was the eighth value coded, the index has the value "7" since the index counting begins with the value "0".

The last set of values is also coded with the "standard" type. However, for the two versions of the same family (British and American English), the values are different. Contrary to the preceding values for this family, the "Single value" type is thus not used, but the "Standard" type, and then the two different strings "Colour" and "Color" are coded. Lastly, it may be noted that for the Spanish version, "Color" a reference is used to the eleventh string indexed (index "10"), "Color".

This example illustrates the use of the mode of coding by a single value, both as regards all the versions and as regards one family of versions, as well as the use of references to strings coded previously.

FIG. 10 shows a particular embodiment of the coding device and of the decoding device of the present invention, 900 and different peripherals adapted to implement each aspect of the present invention. In the embodiment illustrated in FIG. 10, the device 900 is a micro-computer of known type connected, in the case of the coder, via a graphics card 904, to a means for acquisition or storage of structured documents 901, for example an interface with a local computer network or with a memory, adapted to provide data of a structured document.

The device 900 comprises a communication interface 918 connected to a network 934 able to transmit, as input, digital data to code or decode and, as output, data coded or decoded by the device 900. The device 900 also comprises a storage means 912, for example a hard disk, and a drive 914 for a diskette 916. The diskette 916 and the storage means 912 may contain data to code or to decode, coded or decoded data and a computer program adapted to implement the method of coding or the method of decoding of the present invention.

According to a variant, the program enabling the device to implement the present invention is stored in ROM (acronym for "read only memory") 906. In another variant, the program is received via the communication network 934 before being stored.

The device 900 has a screen 905 for viewing the data to be to coded or decoded or for serving as an interface with the user for parameterizing certain operating modes of the device 900, using a keyboard 910 and/or a mouse for example.

A CPU (acronym for "central processing unit") 903 executes the instructions of the computer program and of programs necessary for its operation, for example an operating system. On powering up of the device 900, the programs stored in a non-volatile memory, for example the read only memory 906, the hard disk 912 or the diskette 916, are transferred into a random access memory RAM 908, which will then contain the executable code of the program of the present invention as well as registers for storing the variables necessary for its implementation.

Naturally, the diskette 916 may be replaced by any type of removable information carrier, such as a compact disc, memory card or key. In more general terms, an information storage means, which can be read by a computer or microprocessor, integrated or not into the device, and which may possibly be removable, stores a program of the present invention. A communication bus 902 affords communication between the different elements included in the device 900 or connected to it. The representation, in FIG. 10, of the bus 902 is non-limiting and in particular the central processing unit 903 unit may communicate instructions to any element of the device 900 directly or by means of another element of the device 900.

The device described here and, particularly, the central processing unit 903, may implement all or part of the processing operations described with reference to FIGS. 1 to 7, to implement each method of the present invention and constitute each device of the present invention.

The invention claimed is:

1. A method of coding structured data made of items, at least part of the items being defined by structural information and content information, the structured data including information representing content values according to a plurality of versions for items having the same structural information, the method comprising:

a step of determining, from the structured data, a structure that includes content items, a single content item defining the structural information for items having the same structural information, wherein the structure includes identifying information to identify the content items therein corresponding to items that have content information, and determining content values associated with the content items identified in said structure according to the plurality of versions;

a step of associating, with each content item identified in said structure, a determined content value for each version of plurality of versions, to provide association information that lists the content values according to the plurality of versions for each content item identified in said structure; and a step of encoding the structured data by coding, in a single file:

information representing the plurality of versions;

the association information representing said association between each content item identified in said structure and its respective content values for the plurality of versions and listing the content values according to the plurality of versions for each content item identified in said structure, and said structure of the structured data, wherein at least one of the foregoing steps is performed by one or more processors.

2. The method according to claim 1, wherein, during the coding step, the single file is coded in a binary format for coding a structured document.

3. The method according to claim 2, wherein the information representing content values according to a plurality of versions includes at least one element having a name or at least one attribute having a name, and wherein at least one element name or attribute name is treated as a content item.

4. The method according to claim 1, wherein, during the associating step, the association information comprises, for at least one content item, a type indicating nature of the content item and a content.

5. The method according to claim 4, further comprising a step of comparing said type with a predetermined type list and, if said type does not appear in said list, for said content item, only a single content version is kept.

6. The method according to claim 1, wherein, during the step of coding the single file, said single file represents each association between versions of contents and items with, in the structure, a list that references, for each item having a content, different available versions of said content.

7. The method according to claim 1, wherein, during the step of coding the single file, said single file represents each association between versions of contents and items with the structure and a contents table giving a list, for each version, of different values and, for each item having a content, different versions, each content item being identified by a specific index, and wherein coding is carried out first for the contents table, and then for the structure.

8. The method according to claim 1, wherein, during the step of coding the single file, to code the content items, an index of the item is coded, said index indicating a list of values to consider on decoding, from among a plurality of lists corresponding to different versions of the content.

9. The method according to claim 1, wherein, during the step of coding the single file, coding is carried out of at least one recursive list of values, values forming sub-lists of said recursive list of values.

10. The method according to claim 1, wherein, during the associating step, at least one version is defined by reference to another version.

11. The method according to claim 1, wherein the information representing content values according to a plurality of versions includes a plurality of documents, and wherein during the step of determining the structure that includes content items, a step is carried out of comparing structures of at least two of said documents without taking into account contents.

12. The method according to claim 11, wherein, further to the comparing step, if the structures differ, a step of uniformization of said structures is carried out.

13. The method according to claim 1, wherein, during the associating step, a type is determined and associated with each content item, wherein the type is determined from a type signifying that the item takes a single value and at least one type signifying that the item takes a value from a list of values, said list of values being formed during said associating step.

14. The method according to claim 13, wherein types comprise at least one type indicating that the list comprises sub-lists.

15. The method according to claim 1, wherein during the coding step, the single file is coded in a binary format for coding a structured document, each coded item of the coded single file having an item type indicating at least one of element start, element end, attribute, text, comment and processing instruction.

16. The method according to claim 1, wherein the plurality of versions comprises versions each of which represents a translated text, such that each of the plurality of versions has content corresponding to a respectively different language.

17. The method according to claim 1, wherein the plurality of versions comprises versions each of which represents a modified time based on a geographic region, such that each of the plurality of versions has content corresponding to a respectively different time zone.

18. The method according to claim 1, wherein the plurality of versions comprises versions each of which represents a converted a monetary value, such that each of the plurality of versions has content corresponding to a respectively different currency value.

19. The method according to claim 1, wherein the plurality of versions comprises versions corresponding to user profiles having the same structure and respectively different content.

20. The method according to claim 1, wherein the plurality of versions comprises versions respectively corresponding to scalable vector graphics files having the same structure and respectively different content.

21. The method according to claim 1, wherein the plurality of versions comprises versions corresponding to different versions of a standard having the same structure and different content.

22. The method according to claim 1, wherein the same identifying information is used for the content items in the structure, and wherein a link between each content item and corresponding list of content values according to the plurality of versions is performed through the position of the identifying information for that content item within the structure.

23. A method of decoding encoded structured data made of items, at least part of the items being defined by structural information and content information, the structured data including information representing content values according to a plurality of versions for items having the same structural information, the method comprising:

a step of receiving a request to decode the encoded structured data in a version;

upon receiving the request, a step of decoding a single file to obtain a structure that includes content items, a single content item defining the structural information for items having the same structural information, and that includes identifying information to identify content items therein corresponding to items that have content information, the single file including encoded data representing:

information representing the plurality of versions;

the structure of the structured data that includes content items, and identifying information to identify content items therein corresponding to items that have content information, and association information representing an association, with each content item identified in said structure, of a content value for each version of the plurality of versions, and listing content values according to the plurality of versions for each content item identified in said structure, and a step of decoding, for the version identified in said request, the association information for each content item identified in the structure to obtain the corresponding content value in the version identified in said request; and a step of associating said decoded structure with, for the version identified in said request, the decoded content value for each content item identified in the structure, wherein at least one of the foregoing steps is performed by one or more processors.

24. The method according to claim 23, further comprising:
receiving a request for transmission of a version of a content to an application; and
supplying said version of the content to said application.

25. The method according to claim 24, wherein during the step of receiving a request, an XML interface is used.

26. The method according to claim 23, wherein the same identifying information is used for the content items in the structure, and wherein a link between each content item and corresponding list of content values according to the plurality of versions is performed through the position of the identifying information for that content item within the structure.

27. A device for coding structured data made of items, at least part of the items being defined by structural information and content information, the structured data including information representing content values according to a plurality of versions, the device comprising:
a determining unit constructed to determine, from the structured data, a structure that includes content items, a single content item defining the structural information for items having the same structural information, wherein the structure includes identifying information to identify the content items therein corresponding to items that have content information, and to determine the content values associated with the content items identified in said structure according to the plurality of versions;
an associating unit constructed to associate, with each content item identified in said structure, a determined content value for each version of the plurality of versions, to provide association information that lists the content values according to the plurality of versions for each content item identified in said structure; and
a coding unit constructed to encode the structured data by coding, in a single file, information representing the plurality of versions, the association information representing said association between each content item identified in the structure and its respective content values for the plurality of versions and listing the content values according to the plurality of versions for each content item identified in said structure, and the structure of the structured data.

28. The device according to claim 27, wherein the same identifying information is used for the content items in the structure, and wherein a link between each content item and corresponding list of content values according to the plurality of versions is performed through the position of the identifying information for that content item within the structure.

29. A device for decoding encoded structured data made of items, at least part of the items being defined by structural information and content information, the structured data including information representing content values according to a plurality of versions for items having the same structural information, the device comprising:
a receiving unit constructed to receive a request to decode the encoded structured data in a version;
a decoding unit constructed to decode, upon receiving the request, a single file to obtain a structure that includes content items, a single content item defining the structural information for items having the same structural information, and that includes identifying information to identify content items therein corresponding to items that have content information, the single file including encoded data representing:
information representing the plurality of versions;
the structure of the structured data that includes content items, and identifying information to identify content items therein corresponding to items that have content information, and
association information representing an association, with each content item identified in said structure, of a content value for each version of the plurality of versions, and listing content values according to the plurality of versions for each content item identified in said structure;
a step of decoding, for the version identified in said request, the association information for each content item identified in the structure to obtain the corresponding content value in the version identified in the request; and
an associating unit constructed to associate said decoded structure with, for the version identified in said request, the decoded content value for each content item identified in the structure.

30. The device according to claim 29, wherein the same identifying information is used for the content items in the structure, and wherein a link between each content item and corresponding list of content values according to the plurality of versions is performed through the position of the identifying information for that content item within the structure.

31. A non-transitory computer-readable storage medium retrievably storing a computer-executable program for causing a computer to execute a method of coding structured data made of items, at least part of the items being defined by structural information and content information, the structured data including information representing content values according to a plurality of versions for items having the same structural information, the method comprising:
a step of determining, from the structured data, a structure that includes content items, a single content item defining the structural information for items having the same structural information, wherein the structure includes identifying information to identify the content items therein corresponding to items that have content information, and determining-content values associated with the content items identified in said structure according to the plurality of versions;
a step of associating, with each content item identified in said structure, a determined content value for each version of plurality of versions, to provide association information that lists the content values according to the plurality of versions for each content item identified in said structure; and
a step of encoding the structured data by coding, in a single file:
information representing the plurality of versions;
the association information representing said association between each content item identified in said structure and its respective content values for the plurality of versions and listing the content values according to the plurality of versions for each content item identified in said structure, and said structure of the structured data.

* * * * *